United States Patent [19]
Hoeptner, III

[11] Patent Number: 5,950,658
[45] Date of Patent: Sep. 14, 1999

[54] FLUID FLOW DEVERTER UNIT

[76] Inventor: Herbert W. Hoeptner, III, 7796 Oak Springs Cir., Gilroy, Calif. 95020

[21] Appl. No.: 08/988,924

[22] Filed: Dec. 11, 1997

[51] Int. Cl.⁶ ..................................................... F16K 11/18
[52] U.S. Cl. .................................. 137/115.16; 137/119.05
[58] Field of Search .......................... 137/115.06, 119.01, 137/119.02, 119.03, 119.04, 119.05

[56] References Cited

U.S. PATENT DOCUMENTS

| | | | |
|---|---|---|---|
| 3,086,748 | 4/1963 | Reinemann | 137/467 |
| 3,297,046 | 1/1967 | Hall | 137/119.05 |
| 3,416,555 | 12/1968 | Chapou | 137/467 |

FOREIGN PATENT DOCUMENTS

| | | | |
|---|---|---|---|
| 3239255 | 4/1984 | Germany | 137/467 |

*Primary Examiner*—Stephen M. Hepperle
*Attorney, Agent, or Firm*—William W. Haefliger

[57] ABSTRACT

A fluid flow diverting unit, the combination comprising a body having a hollow interior, and three generally tubular legs defining bores communicating with the interior; a first leg having a fluid inlet port and is attachable to a fluid supply duct; a leg having a pressure fluid flow outlet port and carrying a back flow preventing check valve unit that opens to discharge fluid when pressure in interior exceeds $P_1$; a third leg having a secondary fluid flow outlet port and carrying a valve to control fluid discharge through the secondary outlet port, the valve having a manually operable control characterized in that in a first position of the control the valve is held closed by water pressure to block discharge through a secondary port, and in a second position of the control, the valve is biased open to allow flow through the secondary port.

11 Claims, 5 Drawing Sheets

FLUID FLOW DEVERTER UNIT

BACKGROUND OF THE INVENTION

This invention relates generally to water flow diverters, and more specifically to a diverter attachable to a water supply duct, and operable to allow water flow in one direction, and to divert water flow to discharge in another direction.

There is need for simple, compact, rugged devices of the flow diverter type described; and more specifically there is need for such flow diverters which have simple push-pull operation to achieve flow diversion. Also, there is need for a diverter unit capable of installation on a water supply pipe from which water is supplied to a hose in one operable position of the unit, and via which water is supplied to an outlet of the unit in another operable position of the unit.

SUMMARY OF THE INVENTION

It is a major object of the invention to provide a flow diverter unit meeting the above needs. Basically the unit of the invention comprises, in combination:

a) a body having a hollow interior, and three generally tubular legs defining bores communicating with said interior, b) a first one of said legs having a fluid inlet port and threading attachable to threading on a fluid supply duct, c) a second one of said legs having a pressure fluid flow outlet port and carrying a back flow preventing check valve unit that opens to discharge fluid when pressure in said interior exceeds $P_1$, d) a third one of said legs having a secondary fluid flow outlet port and carrying a valve to control fluid discharge through said secondary outlet port, said valve having a manually operable control characterized in that i) in a first position of said control said valve is held closed by water pressure to block flow through said secondary port, and ii) in a second position of said control, said valve is biased open to allow flow through said secondary port.

It is another object of the invention to provide a control for the unit which is responsive to pressure in the body interior to remain in said first position, whereby fluid then discharges through said first port. As will be seen, the control is advantageously movable axially of said third leg, between said first and second positions.

A further object is to provide a diverter unit, as referred to, wherein the first and third legs extend in generally longitudinal direction, and the second leg extends at an angle to that direction. Typically, the first and third legs extend in substantial longitudinal alignment, and the second leg extends generally laterally.

Yet another object is to provide stopper, seat and spring elements in the third leg, the spring acting to urge the stopper away from the seat to hold the valve open, whereby movement of the control to displace the stopper toward the seat is required to close the valve.

An additional object is to provide the valve at the third leg in the form of a push-pull valve having a manually push-pull valving part remaining in alignment with the said valve.

These and other objects and advantages of the invention, as well as the details of an illustrative embodiment, will be more fully understood from the following specification and drawings, in which:

DRAWING DESCRIPTION

Figure 4:
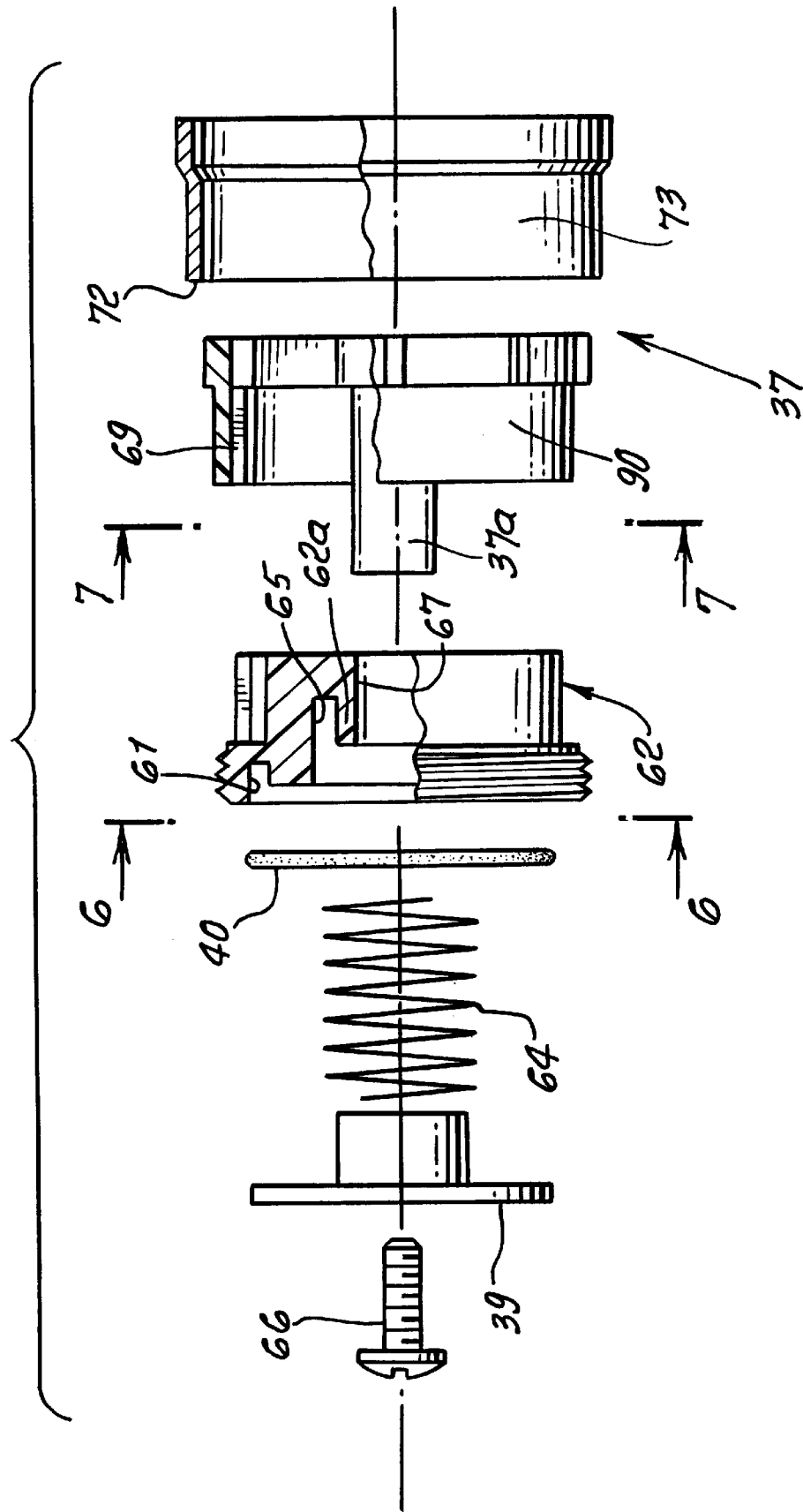
FIG. 4 is an exploded view of diverter components at a third leg of the unit, such components defining a push-pull valve.
Figure 5:
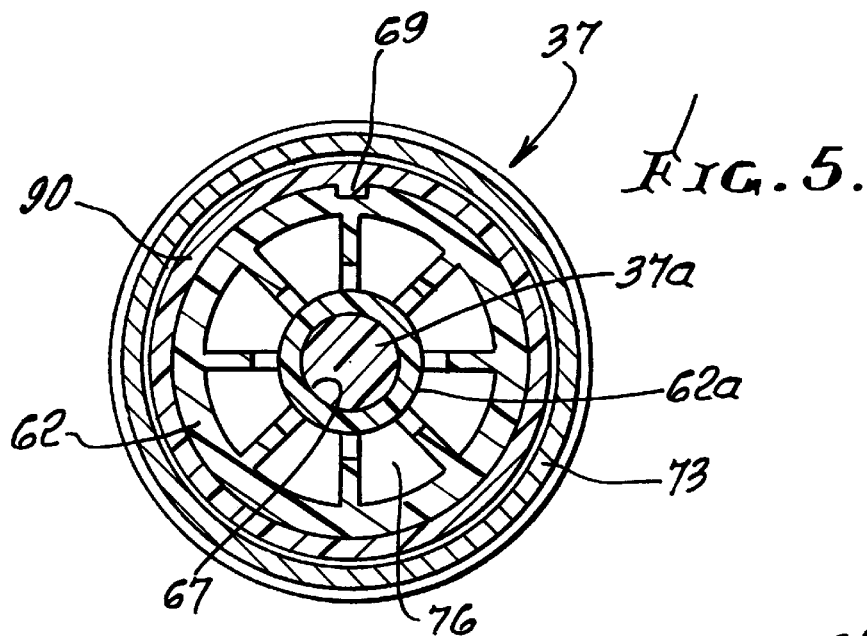
FIG. 5 is a section taken on lines 5—5 of FIG. 2.
Figure 6:
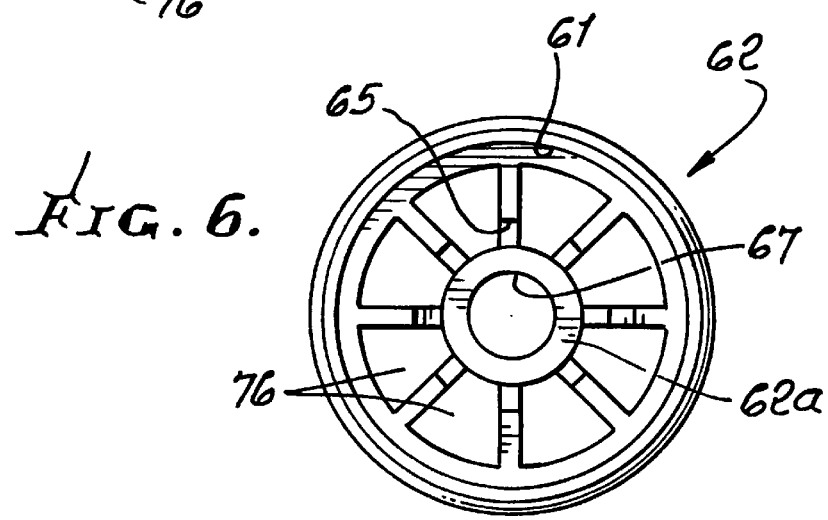
Figure 7:
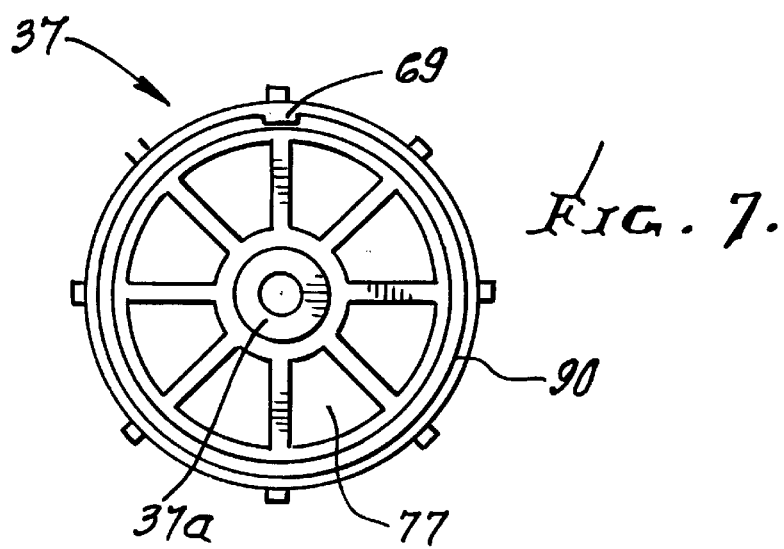

FIGS. 6 and 7 are sections taken on lines 6—6 and 7—7 respectively, of FIG. 4.

DETAILED DESCRIPTION

Figure 1:
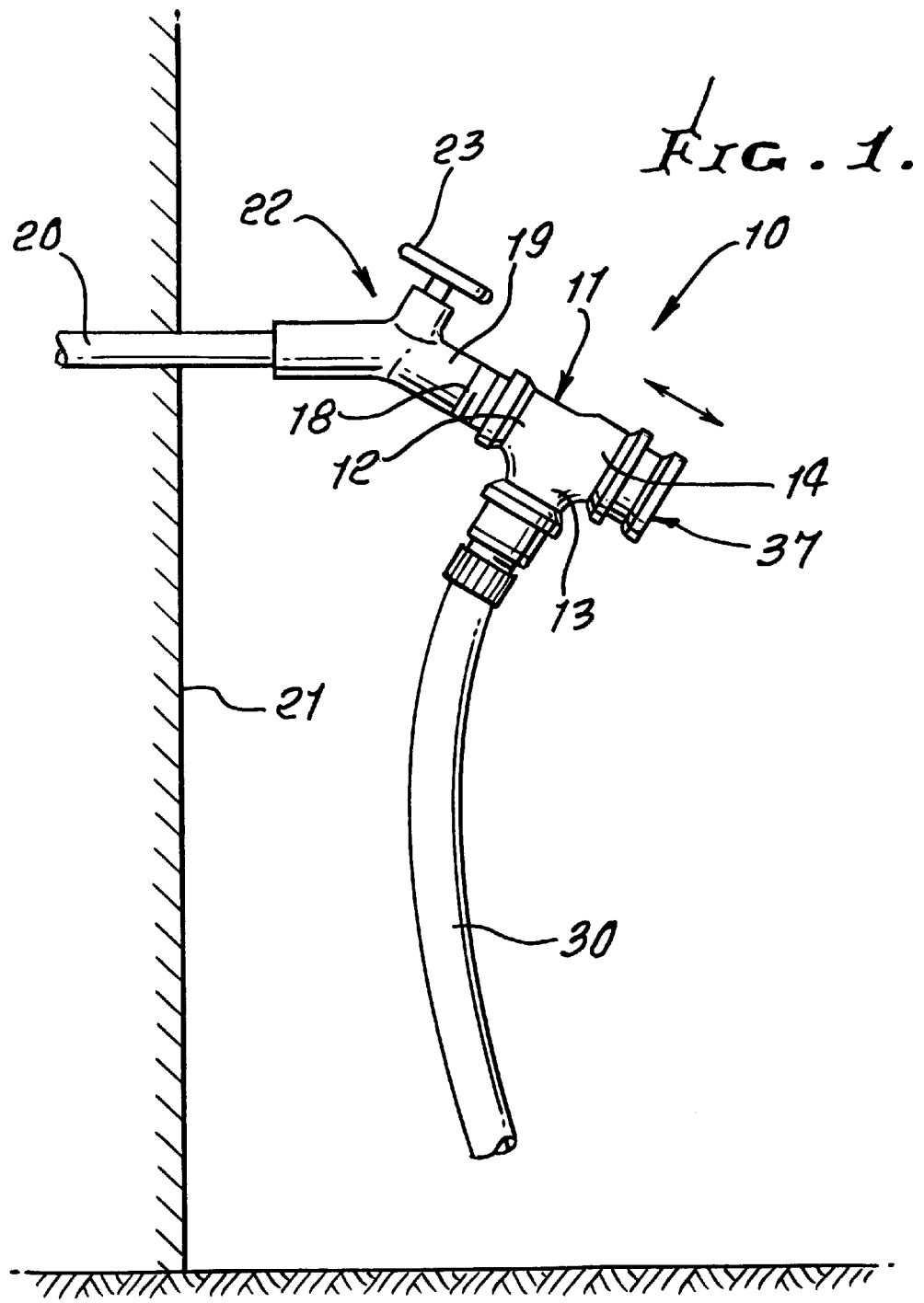
FIG. 1 is an elevation showing installation of the flow diverter unit on a water supply duct on pipe.

In FIG. 1 the fluid flow diverting unit 10, includes a body 11 having three generally tubular legs 12, 13 and 14. The body is hollow and the three legs communicate with a hollow interior seen at 15 in FIGS. 2 and 3. First leg 12 has a fluid inlet port 16 and threading 17 attachable to threading 18 on a fluid supply ducting 19. The latter may include a pipe 20 projecting from a building 21, and an auxiliary valve body 22 connected between 20 and 18. A control handle 23 for the auxiliary valve controls flow to leg 12 of unit 10.

The second leg 13 has a pressure fluid flow outlet port 24, and carries a back flow preventing check valve unit 25 to control fluid discharge through the outlet port 24. Unit 25 is adapted to open discharge fluid such as water when fluid pressure within interior 15 exceeds a predetermined fluid pressure level $P_1$. Unit 25 may include a tubular body 26 containing an annular non-metallic stopper 27, and a stopper plate 28 which is spring urged at 29 for urging the stopper plate against a seat 27a to close off flow through port 27aa. When fluid pressure increases to level $P_1$ stopper 27 is displaced away from 27a, and plate 28 is displaced away from the stopper to allow discharge to a hose or other conduit 30 connected to a sleeve 31. The latter is connected to body 26, and contains the spring 29. Vent or vents 32 discharges any back flow from hose 30 to the exterior. Body 26 is thread-connected at 33 to the leg 13, but other type connectors may be used, as is also true for 17 and 18.

The third leg 14 of the unit body 11 provides a secondary fluid flow outlet port 36, and carries a valve structure to control fluid discharge through port 36. That valve has a manually operable control 37 characterized in that in a first position of the control the valve is held closed by water pressure to block discharge through the secondary port, and in a second position of the control, the valve is biased open to allow flow through the secondary port.

Figure 3:
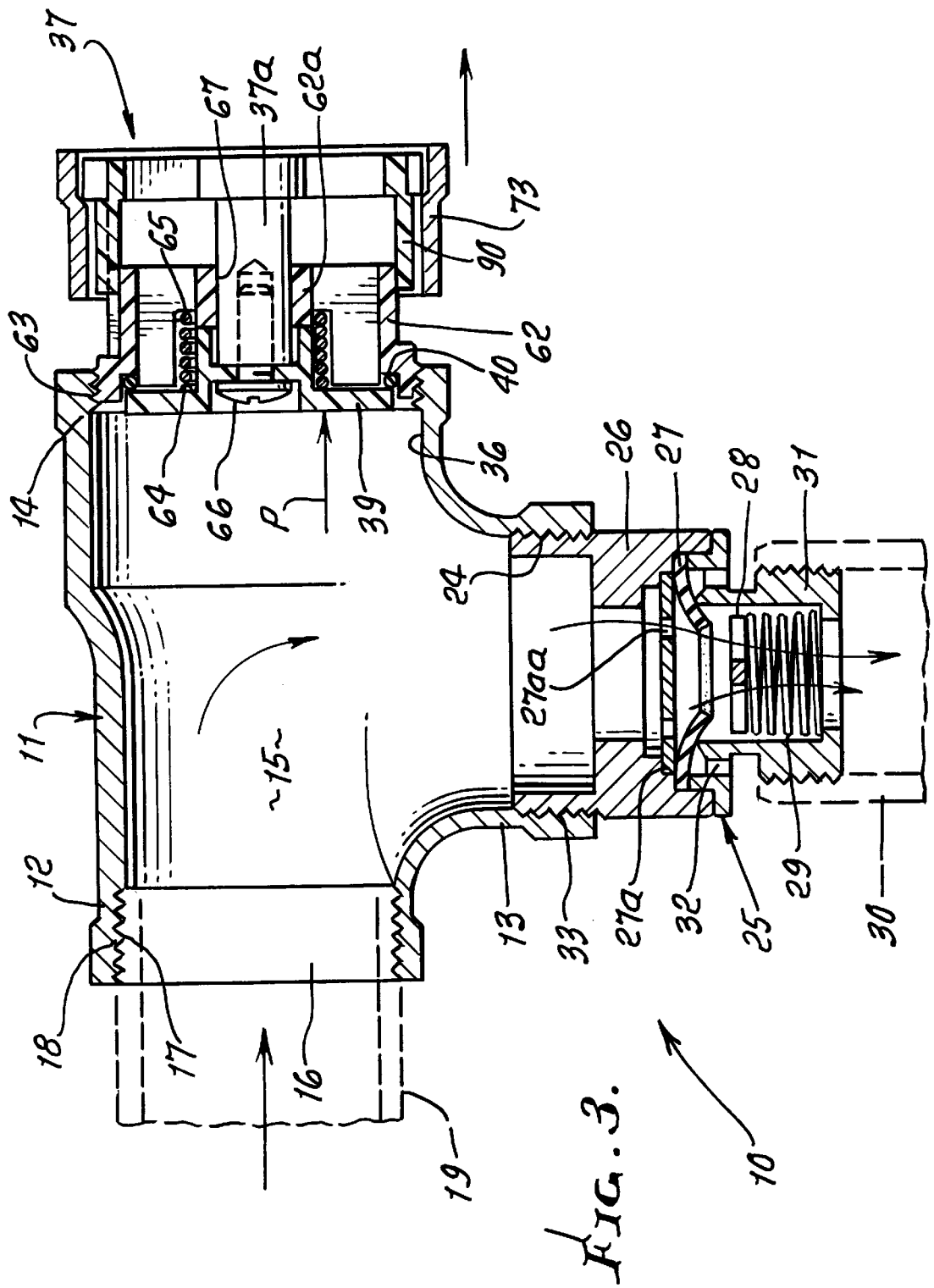
FIG. 3 is an enlarged section like that of FIG. 2 showing another mode of operation in which water diverted flow to the outlet is interrupted, and water flows to a hose.

FIG. 3 shows a first position of the control 37, i.e. pulled away from leg 14, and wherein valve stopper 39 is held closed by water ambient pressure p (for example about 60 psi), the stopper plate engaging an annular O-ring seal 40. The seal is received in an annular groove 61 better seen in FIG. 4, and formed in a tubular sleeve 62. That body has thread connection at 63 seen in FIG. 3 to the leg 14. At such time, a coil spring 64 is compressed by the stopper plate 39, and in a groove 65 formed in sleeve 62. Stopper plate 39 is attached by a fastener 66 to the push-pull control 37 as via a control stem 37a guided for axial movement by a bore 67 formed by a recessed diameter tubular guide 62a integral with 62.. In addition, a key 69 carried by the tubular element 90 is relatively slidable in a groove formed by the control 37 to guide axial movement of the control. The latter may be in the form of a cylindrical knob.

Figure 2:
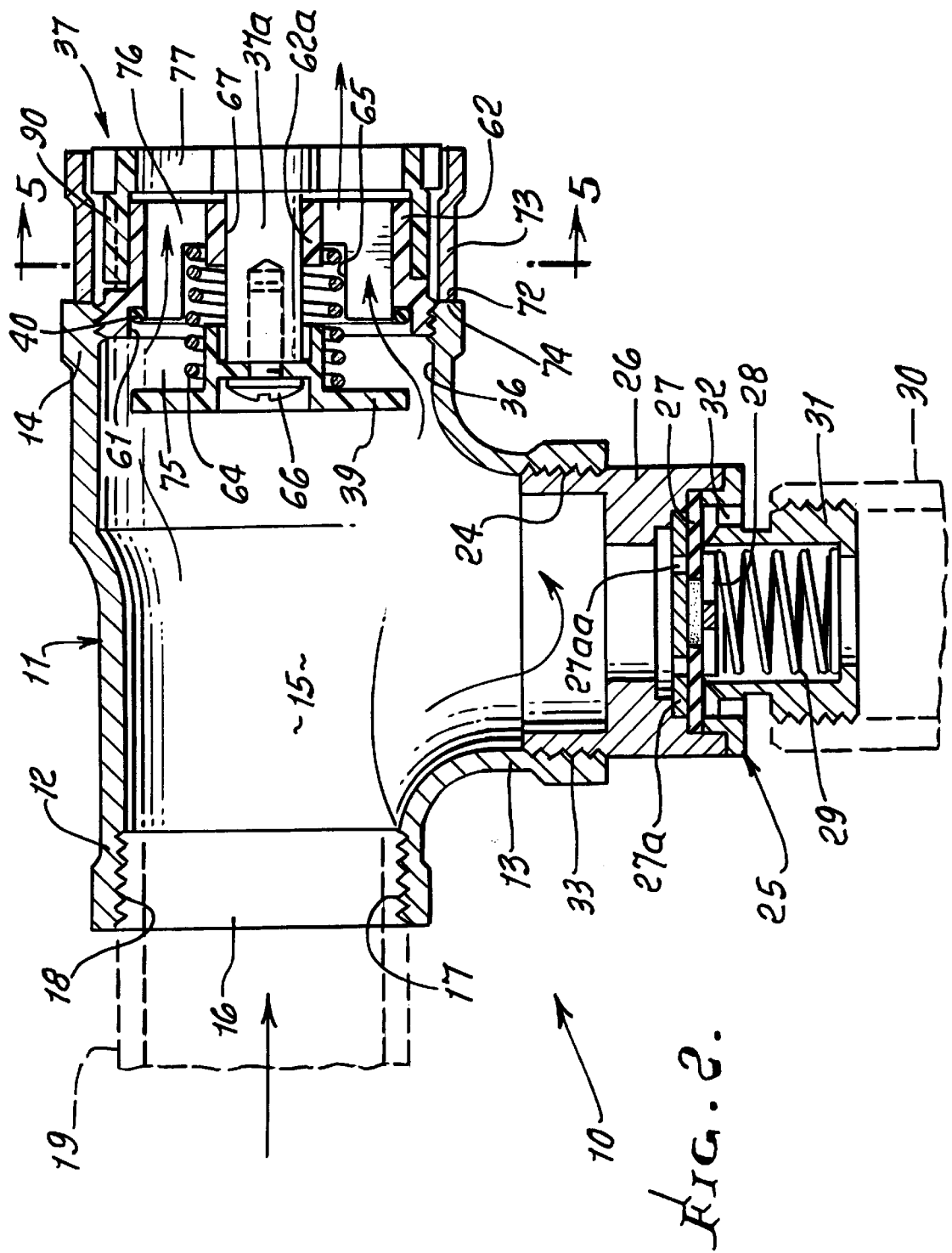
FIG. 2 is an enlarged section taken in elevation through the diverter unit, showing one mode of operation in which water flow is diverted to an outlet.

The second or biased position of the control is shown in FIG. 2 wherein the end 72 of the skirt 73 on the control engages an end wall shoulder 74 on leg 14. At this time, the spring 64 urges the stopper leftwardly, as well as the control 37, tending to hold that valve open for flow out passages 75, 76 and 77 to the exterior, i.e. in a flow diverted mode as may be desired by the user. This enables access to water discharge, without disrupting the connection to hose 30.

It will be noted that the unit 10 has very simple, rugged, and easily operated structure. The first and third legs 12 and 14 extend in generally longitudinally directions; and the second leg extends at an angle to that direction, for example generally laterally. Further, closing of the water diverting valve requires movement of the pulling control 37 to displace stopper plate 39 toward seat 40; and opening of that valve is accomplished by very simple push-in movement of the control 37.

I claim:

1. A fluid flow diverting unit, the combination comprising
   a) a body having a hollow interior, and three generally tubular legs defining bores communicating with said interior,
   b) a first one of said legs having a fluid inlet port and is attachable to a fluid supply duct,
   c) a second one of said legs having a pressure fluid flow outlet port and carrying a back flow preventing check valve unit that opens to discharge fluid when pressure in said interior exceeds a predetermined pressure.
   d) a third one of said legs having a secondary fluid flow outlet port and carrying a valve to control fluid discharge through said secondary outlet port, said valve having a manually operable control characterized in that
      i) in a first position of said control said valve is held closed by water pressure to block discharge through said secondary port, and
      ii) in a second position of said control, said valve is biased open to allow flow through said secondary port,
   e) there being stopper, seat and spring elements in and in alignment with said third leg, with the stopper openly facing said first leg, the spring acting to urge the stopper away from the seat to hold the valve open, whereby movement of the control to displace the stopper toward the seat is required to close the valve.

2. The combination of claim 1 wherein said control is responsive to pressure in said body interior to remain in said first position, whereby fluid then discharges through said first port.

3. The combination of claim 1 wherein said control is movable axially of said third leg, between said first and second positions.

4. The combination of claim 2 wherein said control is movable axially of said third leg, between said first and second position.

5. The combination of claim 1 wherein said first and third legs extend in generally longitudinal direction, and said second leg extends at an angle to said direction.

6. The combination of claim 5 wherein said first and third legs extend in substantial alignment, and said second leg extends generally laterally.

7. The combination of claim 1 including said fluid supply duct to which said one leg is rotatably attached.

8. The combination of claim 7 wherein said duct and said one leg are in alignment with said valve.

9. The combination of claim 1 wherein said valve is a water pressure responsive valve having a manually push-pull valving part remaining in alignment with said one valve.

10. The combination of claim 8 wherein said valve is a water pressure responsive valve having a manually push-pull valving part remaining in alignment with said one valve.

11. The combination of claim 7 including an auxiliary shut-off valve in series with said supply duct.

* * * * *